Jan. 23, 1951  G. ORLOB  2,538,978

SKEW AXIS TRANSMISSION

Filed March 12, 1945

INVENTOR.
GLENN ORLOB
BY Reynolds & Beach
ATTORNEYS

Patented Jan. 23, 1951

2,538,978

UNITED STATES PATENT OFFICE 2,538,978

SKEW AXIS TRANSMISSION

Glenn Orlob, Seattle, Wash., assignor to Boeing Airplane Company, a corporation of Delaware Application March 12, 1945, Serial No. 582,245

7 Claims. (Cl. 74—480)

1

My invention pertains to transmission mechanism of the skew axis type for converting angular movement about one axis into angular movement about a second axis intersecting the first, and more particularly to coordination of counter-rotational movement about the first axis with rotation about the second axis.

In various types of mechanism it is desired to convert oscillating angular movement about one axis into oscillating angular movement about a second axis intersecting the first, often perpendicular to it, at different rotational velocities. It is an object of my invention to effect such operation by mechanism which is positive in action and composed of a few simple parts.

It is a further object to incorporate in such mechanism coaxial shafts which are rotatable in opposed directions, either through the same angle or through different angles, and which are interconnected for conjoint movement during such counter-rotation to rotate with a third member about an axis intersecting the axis of the counter-rotating members. A representative application for such mechanism is an airplane rudder pedal drive in which one pedal is pressed forward to rotate a shaft about a horizontal axis, while the shaft carrying the other pedal is rotated in the opposite direction about the same axis to move its pedal rearward, and simultaneously the forwardly pressed pedal effects rotation of an upright rudder drive shaft in a predetermined direction. Conversely, forward pressure on the other pedal would rotate the shaft in the opposite direction, and would swing rearwardly the first-mentioned pedal.

Further characteristics of my mechanism are that it is compact, and it has no gears or other relatively complicated elements. On the contrary, it is composed of simple links, levers and pivots having merely relative rotational movement, requiring no sliding or end thrust bearings.

Another object of my invention is to provide mechanism in which the rotational movement of the driven rotative element will be progressively decreased for a given increment of rotation of the driving element, as such elements depart farther from an initial or neutral position in either direction.

It is also an object to design my device so that the movement ratio of drive shaft to driven shaft may be varied by altering the drive mechanism structure only slightly.

Manufacture of my drive arrangement is simplified by designing its parts so that identical

2 elements may be interfitted complementally, thus decreasing the number of different parts required both for original fabrication and for spares.

The representative embodiment of my invention shown in the drawings may be employed as airplane rudder pedal transmission mechanism, but it will be appreciated that the principle upon which this apparatus operates may be incorporated in devices having a variety of structures and which are suitable for diverse installations.

Figure 1:
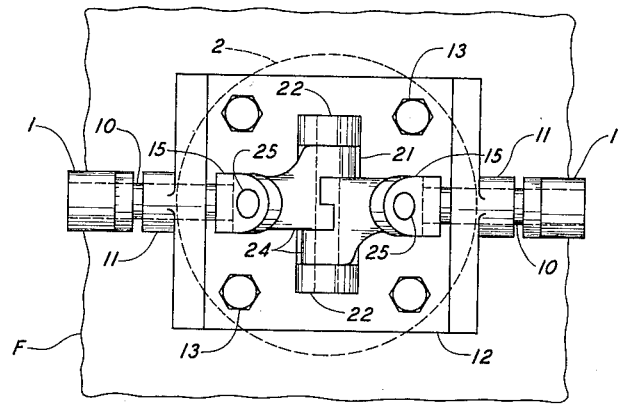
Figure 1 is a plan view of the representative form of my device mentioned.

To utilize my invention as a transmission between rudder actuating mechanism and oppositely movable airplane rudder pedals it must move one pedal support rearwardly as the other pedal support is moved forwardly, and coincidently with such differential movement a rudder actuating element must be operated. A rudder pedal may be supported on each of the lever arms 1, so that forward and rearward generally horizontal displacement of the rudder pedals will swing their lever arms to rotate in opposite directions shafts 10 which carry such lever arms and are disposed horizontally and athwartships of the airplane. These shafts are journaled in radial bearings 11 suitably supported, such as being formed as bosses projecting laterally outward from the flanges of a channel-shaped base 12. The web of this base member may be secured to the floor F of the airplane cockpit by bolts 13.

The airplane rudder may be actuated by rotation of a drive pulley 2 having its periphery grooved to receive a cable, or by an equivalent rotative member or other drive element operatively connected to the rudder to swing it as the upright shaft 20 is rotated. Such shaft is journaled in a bearing provided in a central boss 14 of the base channel 12. While shaft 20 is illustrated as extending downward through the floor of the cockpit it may instead project upwardly, or, in fact, may extend in any direction relative to the axis of the two shafts 10, either perpendicular to them or otherwise, as long as the axes intersect.

Integral with the upper end of shaft 20 is formed or secured a bar 21 extending transversely of the shaft's axis, having upstanding from opposite ends thereof lugs 22, each of which is apertured to receive a pivot pin or rod 23. The lug apertures are located so that the rod received in them is disposed coplanar with shaft 20 and perpendicular to it. Also this rod is coplanar with shafts 10, so that the axes of these shafts, of shaft 20 and of rod 23 all intersect in a common point in every rotative position of the shafts 10 and 20.

On rod 23 are journaled apertured ears of identical eccentric clevis links 24. Each link is formed with one ear having its inner surface disposed substantially centrally of the link shank, while the other ear is offset from the first a distance sufficient to receive between its ears an ear of the other link. Consequently, the ears of the two clevis links 24 may be interfitted substantially to fill the space between the lugs 22 upstanding from bar 21, and to dispose the shank portions of the links generally in the same plane. The end of each link shank remote from its clevis ears has a projecting tip 25 adapted to bear in an aperture provided in the end of a cooperating crank arm 15.

The crank for each link 24, composed of a shaft 10 and a crank arm 15, is, in effect, an integral member, the crank arm being pinned to the crank shaft. By forming the crank of angular shape its ends can be disposed perpendicular to its link 24 and its shaft 10. The two crank shafts can thus be located closer to each other for compactness than if the crank arms were straight, disposed perpendicular to links 24 and secured to shafts 10 at an angle to them. Moreover the crank arms 15 and the shafts 10, as well as lever arms 1, are identical so that only a single design of each of these parts is required.

The particular shape of the crank is not of great importance, and each lever arm 1, shaft 10 and crank arm 15 might be formed initially as a single piece. It is preferred, however, that each crank arm be detachable from the crank shaft carrying it, so that it can be replaced by a crank arm of different length and shape, if desired, for varying the angularity of links 24 relative to the axis of shafts 10. By this expedient, the angular velocity ratio of shaft 10 to shaft 20 may be altered at will. The two cranks may be of similar shape to maintain the angles of links 24 equal, or they may differ so that the angular departure of lever arms 1 from their initial positions will be unequal.

When either of the lever arms 1 is swung to rotate its shaft 10, the corresponding crank arm 15 will be moved angularly so that the link tip 25, journaled in the outer end of such crank arm, will move along a circular arcuate locus concentric with shaft 10. Since movement of the link tip along a circular locus is the only function of the crank 10, 15, it will be evident that any other type of link-actuating member which would move its tip in this fashion could be substituted for the crank arrangement shown.

For any given rotation of crank 10, 15 or equivalent rotatable member, the tips 25 of links 24 will be displaced in a direction perpendicular to the plane defined by shafts 10 and 20, the component of such tip movement as viewed in Figure 1, through a distance proportional to the sine of the angle of crank rotation, which angle may be designated C. If the effective length of each link 24 is represented as $l$, and the angle between link 24 and shaft 10 is designated L, and referred to as the link angle, the radius of the circular locus of tip 25 is $l \sin L$. The actual spatial shift of the link tip perpendicular to the plane of shafts 10 and 20 will be $l \sin L \sin C$.

The angle through which driven shaft 20 turns, which may be designated D, for a given crank movement, will be determined by the shift of link tip 25 perpendicular to the plane of shafts 10 and 20 which will appear in Figure 1. The link must swing up and down in a plane perpendicular to rod 23 and the degree of swing of this rod coincides with the rotative movement of shaft 20. For a given link tip displacement, therefore, rod 23 will be swung, and shaft 20 will be rotated through an angle D whose tangent is the tip displacement as viewed in Figure 1 divided by $l$ times the cosine of the link angle L.

Figure 2:
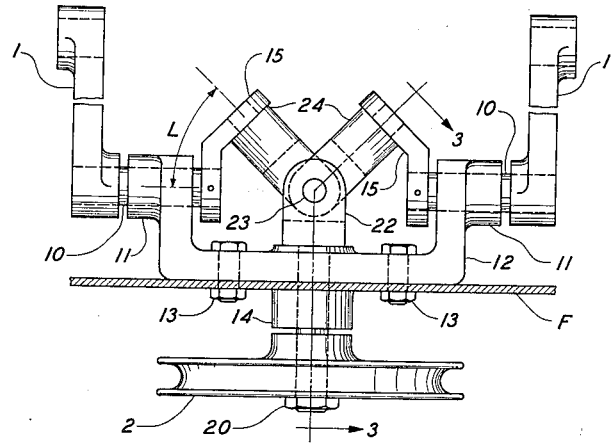
Figure 2 is a side elevational view of it.
Figure 3:
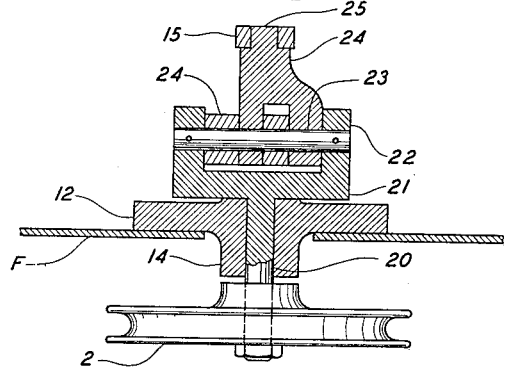
Figure 3 is a generally vertical sectional view through the device taken on line 3—3 of Figure 2.

We may therefore determine the relative angular movement of the crank and of the driven shaft by the following equation, in which selected values for either angle may be inserted.

$$\operatorname{Tan} D = \frac{l \sin L \sin C}{l \cos L}$$
$$= \tan L \sin C$$

Where the link angle L is 45 degrees, as illustrated in the drawing, shaft 20 will rotate through only 45 degrees, namely, the link angle, when the crank has been rotated through 90 degrees from its initial position shown in Figure 2, in which the lever arms 1 are vertical and the link pivot pin 23 is perpendicular to the axis of shafts 10. Similarly, if the link angle is decreased to 30 degrees, the rotation of shaft 20 will be only 30 degrees for a 90 degree rotation of the crank from such initial position. Conversely, if the link angle is increased to 60 degrees shaft 20 will rotate through the same angle of 60 degrees when the crank rotates 90 degrees from its neutral position.

Despite the fact that when the crank has rotated through 90 degrees the rotation of shaft 20 will be equal to the link angle L, whatever it may be, it does not follow that the same relative angular relationship between the crank and the driven shaft will obtain for all degrees of crank rotation, as will be perceived by solving the above equation for various values of crank angle. As a matter of fact, especially for link angles larger than 45 degrees, the angular rotation of shaft 20 may equal or even exceed, the crank rotation for small movements of the crank.

Thus for a crank displacement of 30 degrees from the neutral position, if the link angle is 45 degrees the rotation of shaft 20 will be about 26 degrees 35 minutes, slightly less than the crank angle. The rotation of such shaft will be about 30 degrees 47 minutes, greater than the crank angle, if the link angle is 50 degrees. If the link angle should be increased to 60 degrees, the rotation of driven shaft 20 will be about 40 degrees 53 minutes, or more than a third greater than the crank angle. In many installations the usual degree of crank movement is less than thirty degrees, in which event the angle through which the driven shaft 20 turns will be substantially proportional to the crank angle, since for small angles the sine and the tangent of a given angle are nearly equal. The size of the link angle L would establish the angular ratio in that case, since tan L is a constant.

Despite movement of driven shaft 20 through a larger angle than the crank initially, where the link angle is large, the final angle of rotation of the driven shaft will, as stated, always be less than the crank rotation, namely, equal to the link angle. It will be evident that the rotation of the driven shaft could never equal rotation of the crank when it is rotated through 90 degrees, because that would require that the link angle be 90 degrees, which would eliminate the skew relationship of the axes and render the operation described impossible.

It is interesting to note that the same driven shaft angle of 26 degrees 35 minutes, mentioned above, may be effected by a crank rotation of only 16 degrees 47 minutes if the link angle is 60 degrees, whereas the crank must move through 30 degrees if the link angle is only 30 degrees. It will be evident, therefore, that a large alteration in movement ratio between the crank and the driven shaft can be effected merely by the simple expedient of altering the link angle. With the construction shown this can be accomplished by replacing a crank arm 15 with a long arm having a greater angle between its end portions, or with a shorter arm having a smaller angle between its end portions.

As mentioned above, while, when the crank is moved only slightly from its neutral position, the angle through which the shaft 20 rotates may even be greater than the crank angle, depending upon the link angle selected, the rotative angle of shaft 20 upon rotation of the crank through 90 degrees is always less than the crank angle. Consequently, a further characteristic of my mechanism is that, as the crank is rotated farther from its neutral position, the driven shaft will rotate through a progressively smaller angular increment for a given degree of crank rotation. This effect will become rapidly more noticeable for crank angles larger than 30 degrees, because beyond that angle the values of the sine and tangent of the same angle are decidedly divergent.

While, for purposes of discussion, I have referred to shaft 20 as the driven shaft, my mechanism is reversible. For some applications it may be desirable to rotate shaft 20 positively for the purpose of effecting rotation of shafts 10. Also, as mentioned, it is not necessary that the two shafts 10 rotate through the same angle for a given rotative movement of shaft 20, or that they be disposed coaxially or even coplanar, as long as their axes and that of shaft 20 pass through the same point. Lever arms 1 may have any angular relationship to their shafts 10. However, such relative disposition of the shafts may vary they will all always rotate in the same direction as viewed along their axes toward their common point.

I claim as my invention:

1. Transmission mechanism comprising three separate rotative members, each member being rotative relative to the other two, and said members being arranged with their rotative axes all passing through a common point, at least two of such axes intersecting, the axes of two of said members being disposed at an angle substantially greater than 90 degrees, means including links pivoted, respectively, to said rotative members, interconnecting said rotative members to coordinate rotation of all said members in the same direction as viewed along said members in the directions of their rotative axes toward their common point, and means restraining each of said rotative members against axial displacement during conjoint rotation of all of said members.

2. Transmission mechanism comprising three separate shafts having their axes passing through a common point, the axes of two of said shafts lying substantially in a common plane intersected by the axis of the third of said shafts, and separate links pivotally connected to one of said shafts and to each of the other of said shafts, respectively, said links being rotatable conjointly with said one shaft and operable to coordinate rotation of all of said shafts in the same direction as viewed along their rotative axes toward their common point.

3. Transmission mechanism comprising three separate shafts having their axes substantially coplanar and passing through a common point, the axes of two of said shafts being substantially aligned and at an angle to the axis of the third of said shafts, and separate links pivotally connected to one of said shafts for rotation conjointly therewith, and to each of the other of said shafts, respectively, and operable to coordinate rotation of all of said shafts in the same direction as viewed along their rotative axes toward their common point.

4. Transmission mechanism comprising three separate rotative members arranged with their rotative axes all passing through a common point, at least two of such axes intersecting, separate links pivotally connected, respectively, to two of said rotative members, pivot means interconnecting said links and disposed always perpendicular to both of said links, and means connecting said pivot means to the other of said rotative members perpendicular thereto and coordinating rotation of said rotative members with swinging of said pivot means and said links.

5. Transmission mechanism comprising two separate cranks arranged with their rotative axes passing through a common point, a rotative member disposed with its rotative axis intersecting the axes of said cranks at such common point, two links connected, respectively, one to each of said cranks, and a pivot pin interconnecting such links and said rotative member, having its axis also passing through such common point, and operable to coordinate rotation of said rotative member and said cranks with swinging of said pivot pin and said links.

6. Transmission mechanism comprising three separate shafts having their rotative axes disposed substantially coplanar and passing through a common point, two of said shafts being substantially in alignment, and the third shaft being disposed substantially perpendicular to the other two shafts, two crank arms secured one to each of said aligned shafts, two links connected, respectively, one to each of said crank arms, and pivot means carried by said third shaft, interconnecting said links in interfitting arrangement to dispose their axes always in a plane including the axis of said third shaft, and operable to coordinate movement of said shafts to rotate them all in the same direction as viewed along their axes toward such common point.

7. Transmission mechanism comprising three separate shafts having their axes disposed substantially coplanar and passing through a common point, two of said shafts being in alignment, and the third shaft being disposed substantially perpendicular to the other two shafts, two identical crank arms secured one to each of said aligned shafts, two identical links connected, respectively, one to each of said crank arms, and a pivot pin carried by said third shaft, having its axis also passing through such common point, interconnecting said links in interfitting arrangement to dispose their axes always in a plane including the axis of said third shaft, and operable to coordinate movement of said shafts to rotate them all in the same direction as viewed along their axes toward such common point, such rotation of said aligned shafts being through equal angles and rotation of said third shaft being through a different angle.

GLENN ORLOB.

REFERENCES CITED

The following references are of record in the file of this patent:

UNITED STATES PATENTS

| Number | Name | Date |
|---|---|---|
| 860,155 | Russel | July 16, 1907 |
| 895,305 | Russel | Aug. 4, 1908 |
| 1,231,136 | De Voe | June 26, 1917 |
| 1,306,104 | De Voe | June 10, 1919 |
| 2,221,976 | Kurtz | Nov. 19, 1940 |

FOREIGN PATENTS

| Number | Country | Date |
|---|---|---|
| 333,446 | France | Nov. 25, 1903 |
| 61,504 | Switzerland | Sept. 20, 1912 |
| 378,899 | Germany | Aug. 7, 1923 |
| 731,923 | France | Sept. 10, 1932 |